(12) United States Patent
Lee et al.

(10) Patent No.: US 10,325,058 B2
(45) Date of Patent: Jun. 18, 2019

(54) METHOD FOR VERIFYING A LAYOUT DESIGNED FOR A SEMICONDUCTOR INTEGRATED CIRCUIT AND A COMPUTER SYSTEM FOR PERFORMING THE SAME

(71) Applicant: SAMSUNG ELECTRONICS CO., LTD., Suwon-si, Gyeonggi-Do (KR)

(72) Inventors: Moo-Kyung Lee, Seoul (KR); Jaeick Son, Hwaseong-si (KR); Sunghoon Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 49 days.

(21) Appl. No.: 15/443,195

(22) Filed: Feb. 27, 2017

(65) Prior Publication Data

US 2017/0329889 A1 Nov. 16, 2017

(30) Foreign Application Priority Data

May 12, 2016 (KR) .......................... 10-2016-0058400

(51) Int. Cl.
*G06F 17/50* (2006.01)

(52) U.S. Cl.
CPC ...... *G06F 17/5081* (2013.01); *G06F 17/5072* (2013.01); *G06F 2217/06* (2013.01); *G06F 2217/12* (2013.01)

(58) Field of Classification Search
CPC .. G06F 17/5081; G06F 17/5068; G06F 17/50; G06F 17/5009; G06F 2217/10; G06F 2217/12; G06F 17/504; G03F 7/705; G03F 1/84; G03F 1/36; G03F 1/24; G03F 1/70; G03F 1/72; G03F 7/70433; G03F 7/7065

USPC ................................. 716/50–56; 430/5, 30
See application file for complete search history.

(56) References Cited

U.S. PATENT DOCUMENTS

| | | | |
|---|---|---|---|
| 7,640,530 B2* | 12/2009 | Ando | G03F 1/84 703/14 |
| 7,681,170 B2 | 3/2010 | Liao et al. | |
| 7,752,584 B2 | 7/2010 | Yang | |
| 8,161,428 B2* | 4/2012 | Yokogawa | G06F 17/5081 716/106 |
| 9,292,710 B2 | 3/2016 | Kim et al. | |
| 2005/0268256 A1* | 12/2005 | Tsai | G03F 1/36 716/52 |
| 2008/0046849 A1 | 2/2008 | Choi | |

(Continued)

FOREIGN PATENT DOCUMENTS

| KR | 100559588 | 3/2006 |
|---|---|---|
| KR | 1020060059673 A | 6/2006 |

(Continued)

*Primary Examiner* — Nghia M Doan
(74) *Attorney, Agent, or Firm* — Volentine, Whitt & Francos, PLLC

(57) ABSTRACT

An integrated circuit of a semiconductor device is fabricated by forming patterns on a wafer in conformance with a layout of the patterns. A method for verifying the layout includes providing a virtual pattern on a predicted defect point in the layout, and identifying at least one pattern from among those of the layout using the virtual pattern. The predicted defect point corresponds to a weak point where it is determined in advance that a defect will occur when the layout is transcribed on a wafer. The identified pattern is a pattern that is adjacent to the virtual pattern in the layout.

15 Claims, 9 Drawing Sheets

(56) References Cited

U.S. PATENT DOCUMENTS

2011/0230045 A1    9/2011  Nam
2012/0110531 A1*   5/2012  Liao .................... G06F 17/5081
                                                          716/112
2012/0221991 A1    8/2012  Liu et al.

FOREIGN PATENT DOCUMENTS

KR         100742969 B1    7/2007
KR        1020070136942   12/2007
KR         100881514       1/2009

* cited by examiner

METHOD FOR VERIFYING A LAYOUT DESIGNED FOR A SEMICONDUCTOR INTEGRATED CIRCUIT AND A COMPUTER SYSTEM FOR PERFORMING THE SAME

PRIORITY STATEMENT

This U.S. nonprovisional patent application claims priority under 35 U.S.C. § 119 of Korean Patent Application 10-2016-0058400 filed on May 12, 2016, the entire contents of which are hereby incorporated by reference.

BACKGROUND

The present inventive concept relates to a method for verifying a layout designed for a semiconductor integrated circuit, to a computer system for performing the same, and to a method of manufacturing a semiconductor device conforming to a specified layout.

Patterns of semiconductor devices become finer as the integration of semiconductor devices is increased, i.e., as the devices are scaled down, but there is a limitation to the extent to which patterns can be made finer due to technical limits of processes for fabricating semiconductor devices. If these limits are exceeded as can occur when fabricating a semiconductor integrated circuit to a computer designed layout of the circuit, defects (e.g., a bridge) can occur in patterns formed on a wafer.

SUMMARY

According to an aspect of the present inventive concept, there is provided a method for verifying a layout designed for a semiconductor integrated circuit, the method comprising: providing a pattern layout comprising a plan view of patterns, and which specifies patterns of the integrated circuit, providing a virtual pattern on a predicted defect point in the pattern layout, the predicted defect point being a predictor of a location where a defect will occur when the patterns of the pattern layout are transcribed on a wafer, and identifying at least one pattern, from among the patterns of the pattern layout, that is adjacent to the virtual pattern in the pattern layout.

According to another aspect of the present inventive concept, there is provided a computer system comprising: a library configured to store a pattern layout comprising a plan view of patterns and which specifies patterns of the integrated circuit, and a verification module configured to verify a pattern layout provided by the library. The verification module provides a virtual pattern on a predicted defect point in the pattern layout and identifies at least one pattern, from among patterns of the pattern layout, adjacent to the virtual pattern in the pattern layout. The predicted defect point is a predictor of a location where a defect will occur when the patterns of the pattern layout are transcribed on a wafer.

According to another aspect of the present inventive concept, there is provided a method of manufacturing an integrated circuit of a semiconductor device, the method comprising: designing a pattern layout comprising a plan view of patterns, and which specifies patterns of the integrated circuit, predicting a location in the integrated circuit where a defect will occur when patterns, corresponding to those of the pattern layout, are formed on a substrate by a semiconductor device patterning process of transcribing patterns on the substrate, providing a virtual pattern on a point in the pattern layout based on the predicted location of the defect, identifying a pattern of the pattern layout that is adjacent to the virtual pattern, determining whether the identified pattern requires correction in the pattern layout, and subsequently manufacturing the integrated circuit including by performing the semiconductor device patterning process to transcribe patterns, corresponding to those specified by the pattern layout, on a substrate.

DETAILED DESCRIPTION

Figure 1:
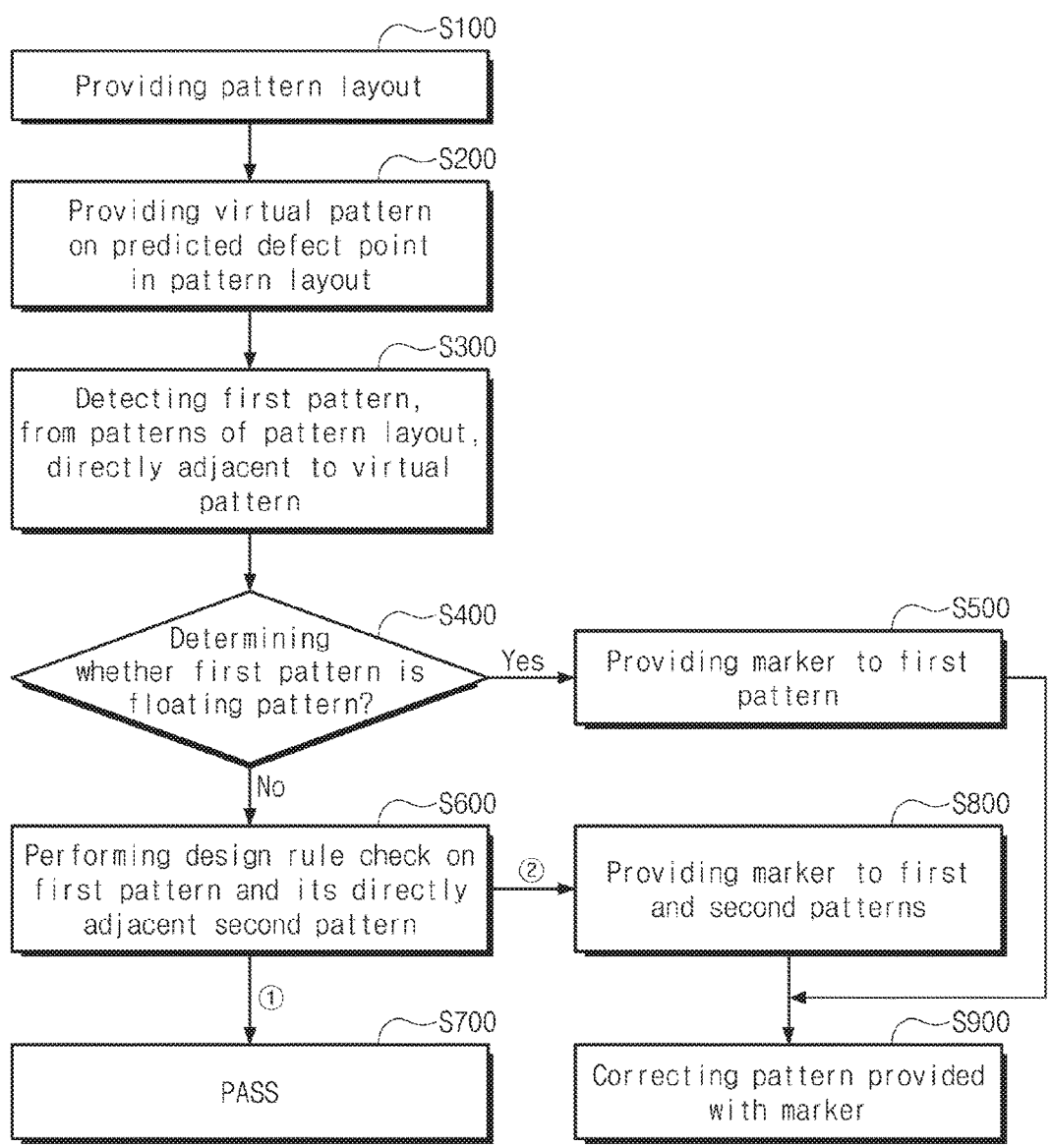
FIG. 1 is a flow chart of examples of a method for verifying a layout designed for a semiconductor integrated circuit according to the present inventive concept.

FIG. 1 is a flow chart illustrating a method for verifying a layout designed for a semiconductor integrated circuit according to the present inventive concept. FIGS. 2 to 7 are diagrams illustrating steps of the method of FIG. 1.

Figure 2:
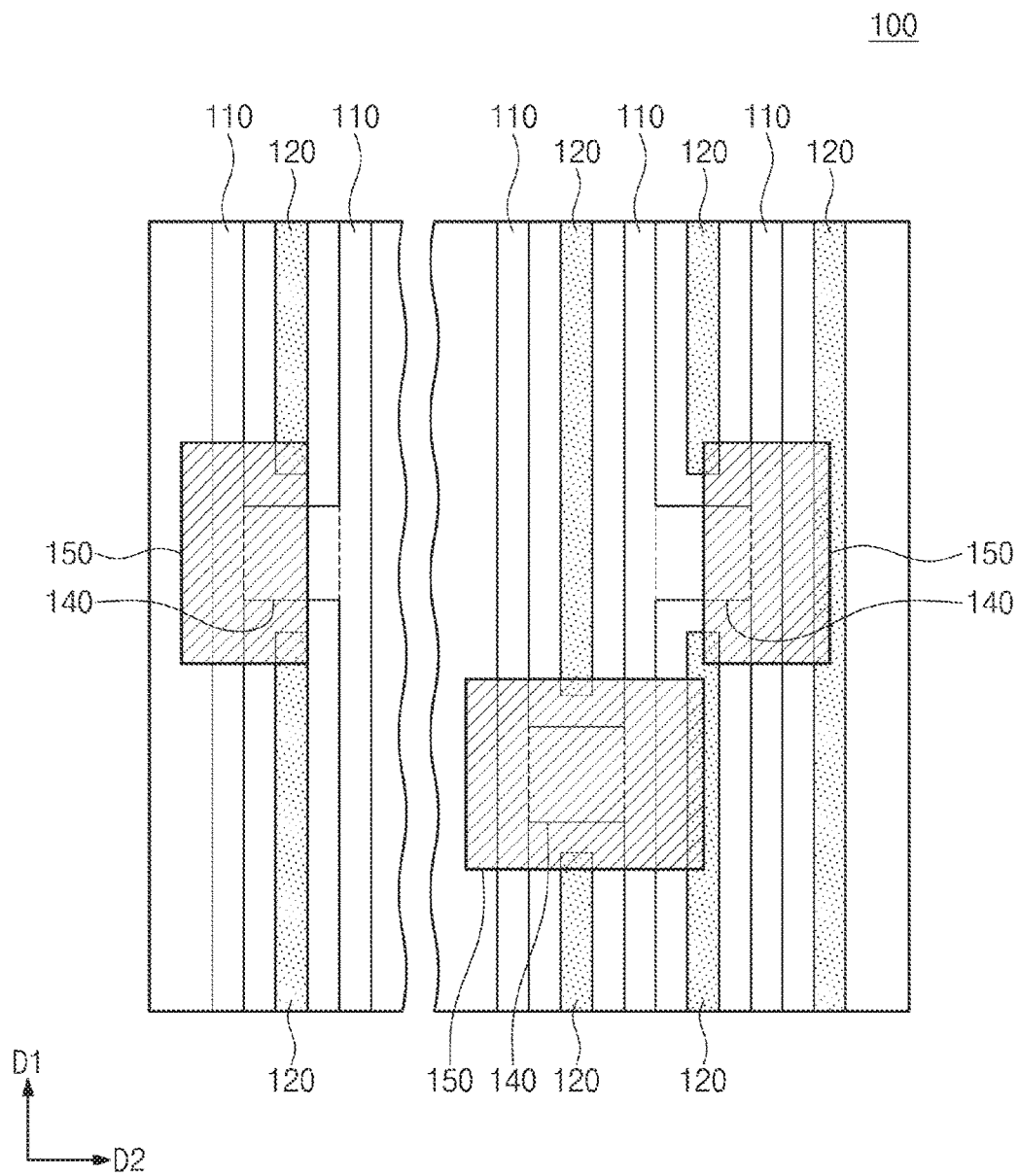
FIGS. 2, 3, 4, 5, 6 and 7 are conceptual diagrams of steps in the method of FIG. 1.

Referring to FIGS. 1 and 2, a pattern layout 100 for forming a semiconductor integrated circuit is provided (S100). The pattern layout 100 may define shapes or sizes of patterns which are to be formed on a wafer. In some examples, the pattern layout 100 may include a plurality of first patterns 110 and a plurality of second patterns 120. The first patterns 110 and the second patterns 120 may extend in a first direction D1 and be spaced apart from each other in a second direction D2 crossing (perpendicular to) the first direction D1. The first patterns 110 and the second patterns 120 may be alternately and repeatedly arranged along the second direction D2. The pattern layout 100 may also include an interconnect pattern 140 that is provided between and connects respective ones of the first patterns 110 spaced apart from each other in the second direction D2. Two second patterns 120 spaced apart from each other in the first direction D1 may be interposed between the first patterns 110 connected to each other by the interconnect pattern 140, with the interconnect pattern 140 extending between the spaced apart second patterns 120.

As viewed in plan, the pattern layout 100 may further include a trim pattern 150 overlapping the interconnect pattern 140. The trim pattern 150 may be arranged to run across at least one of the first patterns 110 connected to each other by the interconnect pattern 140. For example, as viewed in plan, the trim pattern 150 may cover the interconnect pattern 140 and run across the first patterns 110 that are connected to each other through the interconnect pattern 140. Alternatively, as viewed in plan, the trim pattern 150 may overlap the interconnect pattern 140 (i.e., cover one portion of the interconnect pattern 140 and expose another portion of the interconnect pattern 140) and run across one of the first patterns 110 that are connected to each other through the interconnect pattern 140. In the event that features corresponding to those defined by the pattern layout 100 are formed on a wafer (which process may be referred to hereinafter as transcribing the pattern layout 100 on a wafer), portions of the patterns 110, 120 and 140 covered by the trim pattern 150 are not formed. In other words, the trim pattern 150 may define the portions of the patterns 110, 120 and 140 which are to be removed by a trimming process in the method of fabricating the semiconductor device.

Figure 3:
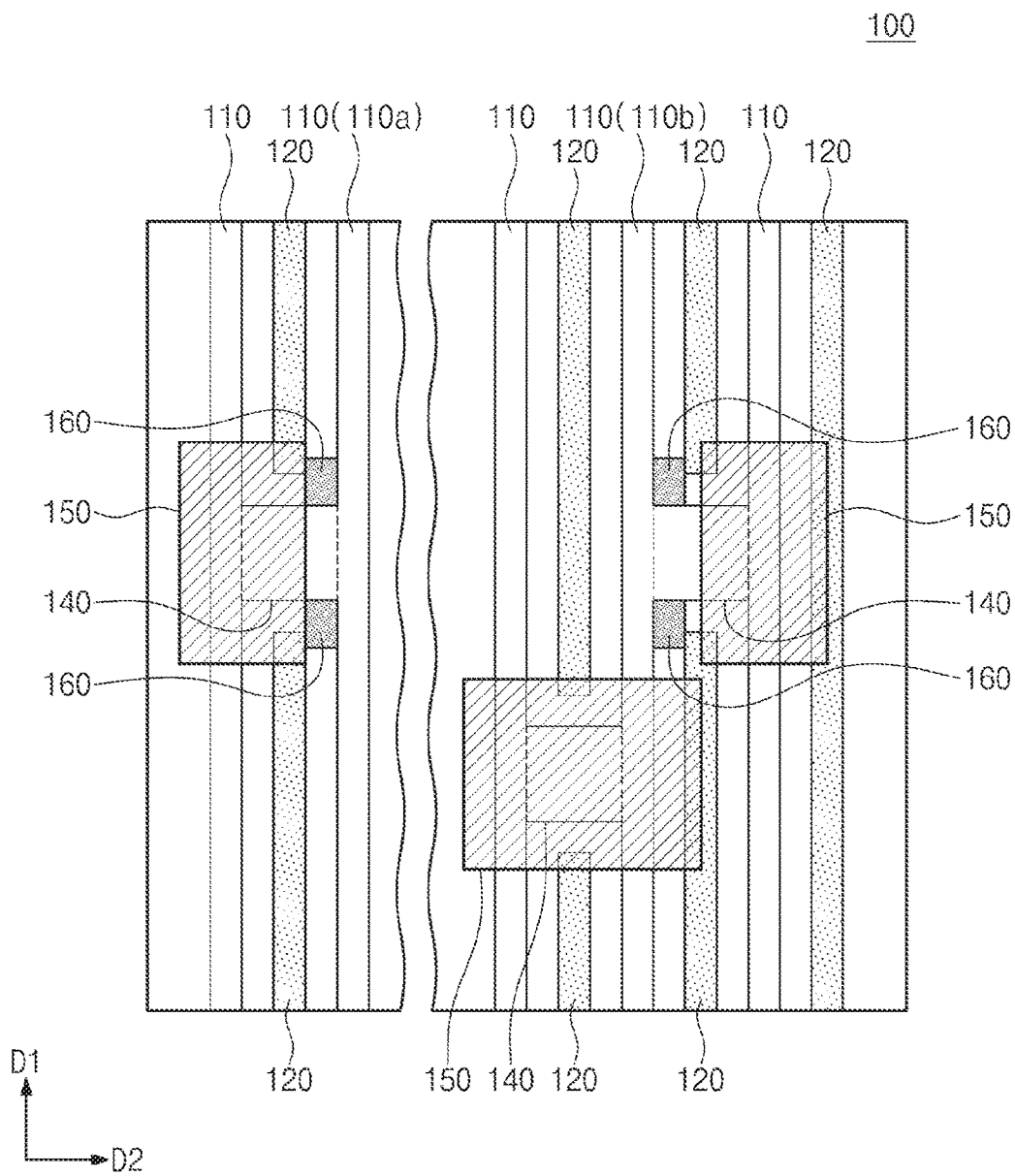

Referring to FIGS. 1 and 3, a virtual pattern 160 may be provided on a predicted defect point in the pattern layout 100 (S200). The predicted defect point may be empirically determined. The predicted defect point may be a weak point at which, according to data acquired empirically, for example, that a defect will occur when the pattern layout 100 is transcribed as is on a wafer. The defect may be a bridge between the first pattern 110 and the second pattern 120 that are directly adjacent to each other. In this case, the virtual pattern 160 may be provided between the first pattern 110 and the second pattern 120 while being adjacent to the portion of the interconnect pattern 140 that is exposed by the trim pattern 150. The virtual pattern 160 may span the first pattern 110 and the second pattern 120 and thereby virtually connect the first pattern 110 and the second pattern 120 to each other. Subsequently, the first pattern 110a or 110b that is adjacent to, i.e., contiguous with, the virtual pattern 160 may be identified (S300).

Figure 4:
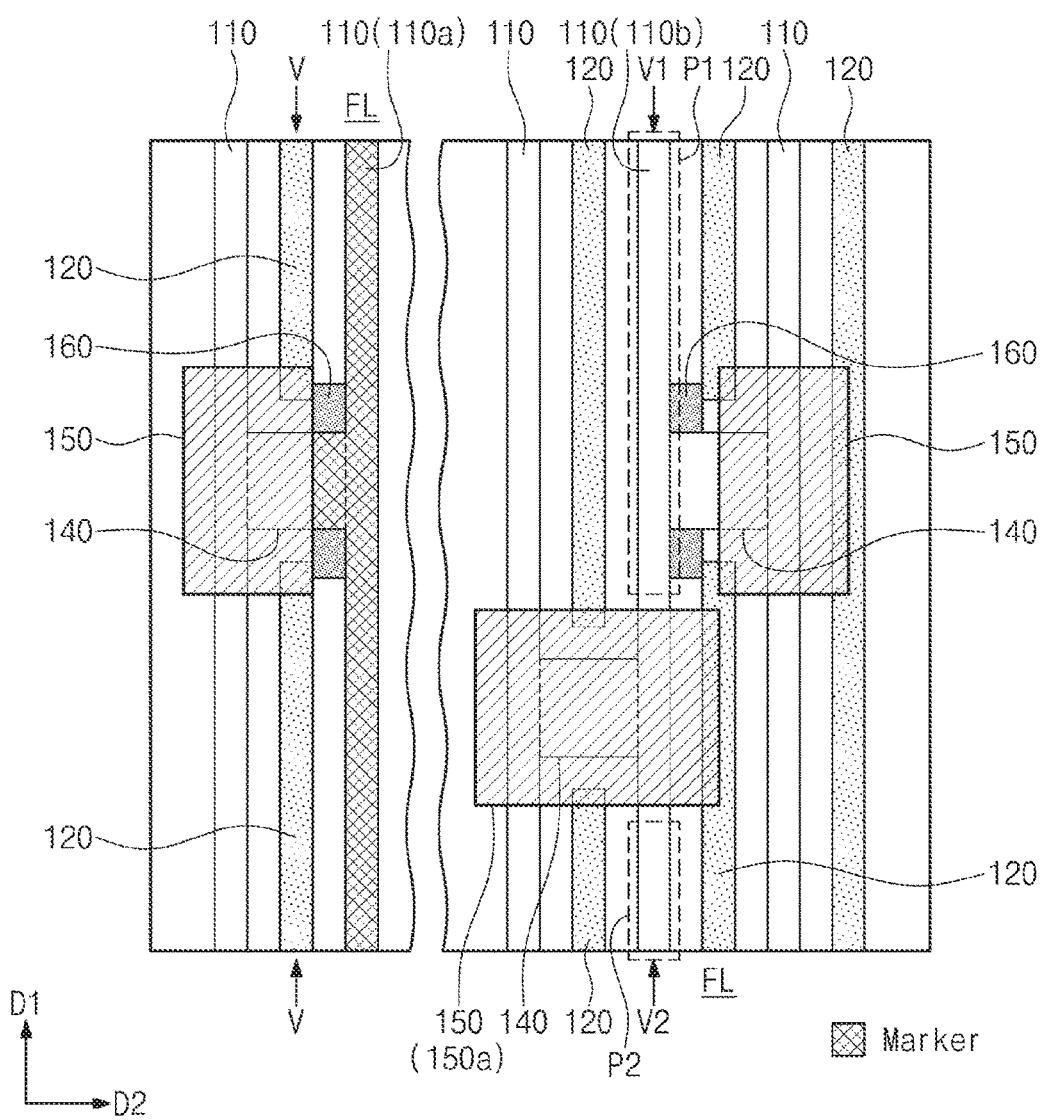

Referring to FIGS. 1 and 4, a decision may be performed to determine whether the first pattern 110a or 110b corresponds to (i.e., is used to form) a floating pattern (S400). In this description, the term "floating pattern" may refer to a pattern that is not electrically connected to other patterns in a device formed according to the pattern layout 100. More specifically, a floating pattern is not electrically connected to but is insulated from other patterns formed on a wafer when the pattern layout 100 is transcribed on the wafer. As shown in FIG. 4, the first pattern 110a may be provided with a marker when the first pattern 110a corresponds to a floating pattern FL. Accordingly, such a pattern 100a or 100b of the pattern layout 100 may be referred to itself as a floating pattern FL.

In more detail, the virtual pattern 160 may connect the first pattern 110a to its neighboring second pattern 120. In a case in which the first pattern 110 is the floating pattern FL, i.e., in the case of first pattern 110a, and a voltage V is applied to the second pattern 120, a bias of the first pattern 110a may be changed by the voltage V applied to the second pattern 120. In other words, the virtual pattern 160 may define a defect (e.g., a bridge) between the first pattern 110a and the second pattern 120. Therefore, the first pattern 110a may be provided with the marker for the purpose of correcting a layout of the first pattern 110a.

Figure 5:
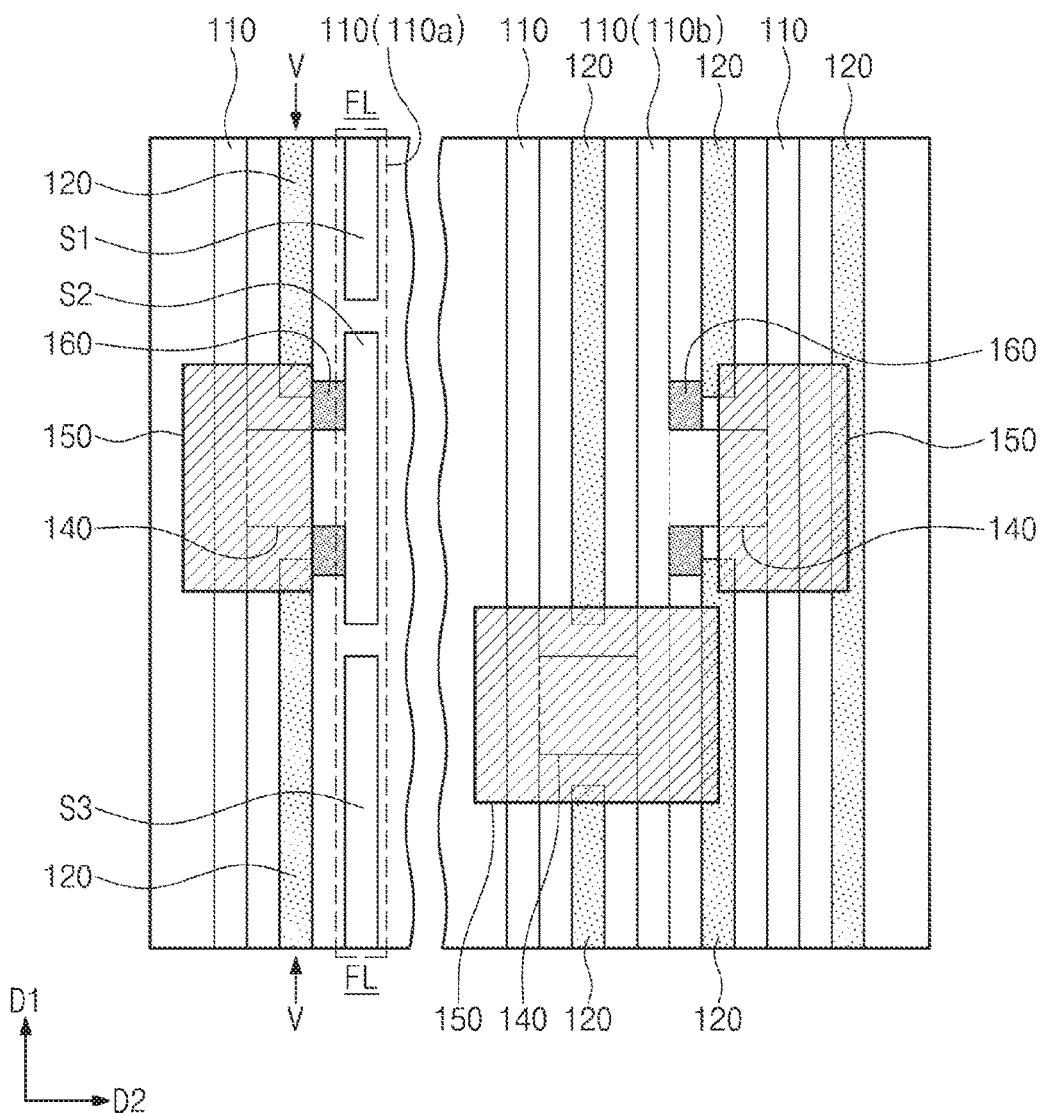

Referring to FIGS. 1 and 5, a correction may be performed on the first pattern 110a provided with the marker (S900). The correction may include cutting the first pattern 110a provided with the marker into a plurality of segments S1, S2 and S3. The plurality of segments S1, S2 and S3 may be floating patterns that are spaced apart from each other in the first direction D1. In this case, when the pattern layout 100 is transcribed on a wafer, it may be possible to prevent a bias of the pattern corresponding to (i.e., transcribed from) the first pattern 110a from being changed due to a voltage V applied to the pattern corresponding to (i.e., transcribed from) the second pattern 120 even though an actual defect (e.g., a bridge) has occurred at the predicted defect point, i.e., a point corresponding to that where the virtual pattern 160 was formed. That is, at least one or more S1 and/or S3 of the plurality of segments S1, S2 and S3 may maintain a floating state (e.g., an electrically insulated state).

Subsequently, the marker and the virtual pattern 160 may be removed from the layout.

Referring back to FIGS. 1 and 4, in a case in which the first pattern 110 is not a floating pattern, i.e., in the case of first pattern 110b, a design rule check may be performed on the first pattern 110b and its directly adjacent second pattern 120 (S600). In more detail, in the case of a first pattern 110b that is not a floating pattern, the pattern layout 100 may be provided with an additional trim pattern 150a running across the first pattern 110b. The first pattern 110b may include a first part P1 and a second part P2 that are separated from one another by the additional trim pattern 150a. The first part P1 and the second part P2 may be aligned in the first direction D1. The first part P1 may be connected to a neighboring second pattern 120 by the virtual pattern 160, and the second part P2 may be spaced apart from the second pattern 120. The performing of the design rule check may include, with respect to the first pattern 110b and the second pattern 120, checking a space rule between patterns to which different voltages are applied. For example, in a case in which different voltages are applied to a pair of patterns arranged in the second direction D2, the space rule may be that at least one floating pattern is interposed between the pair of patterns. For example, different voltages V1 and V2 may be applied to the first part P1 and the second part P2, and the second pattern 120 may be the floating pattern FL. In the event that the virtual pattern 160 connects the second pattern 120 to the first part P1, a bias of the second pattern 120 may be changed by the voltage V1 applied to the first part P1. In this case, different voltages may be applied to the second part P2 and the second pattern 120 which are arranged in the second direction D2 and are directly adjacent to each other. Therefore, an error may occur under the space rule check.

Figure 6:
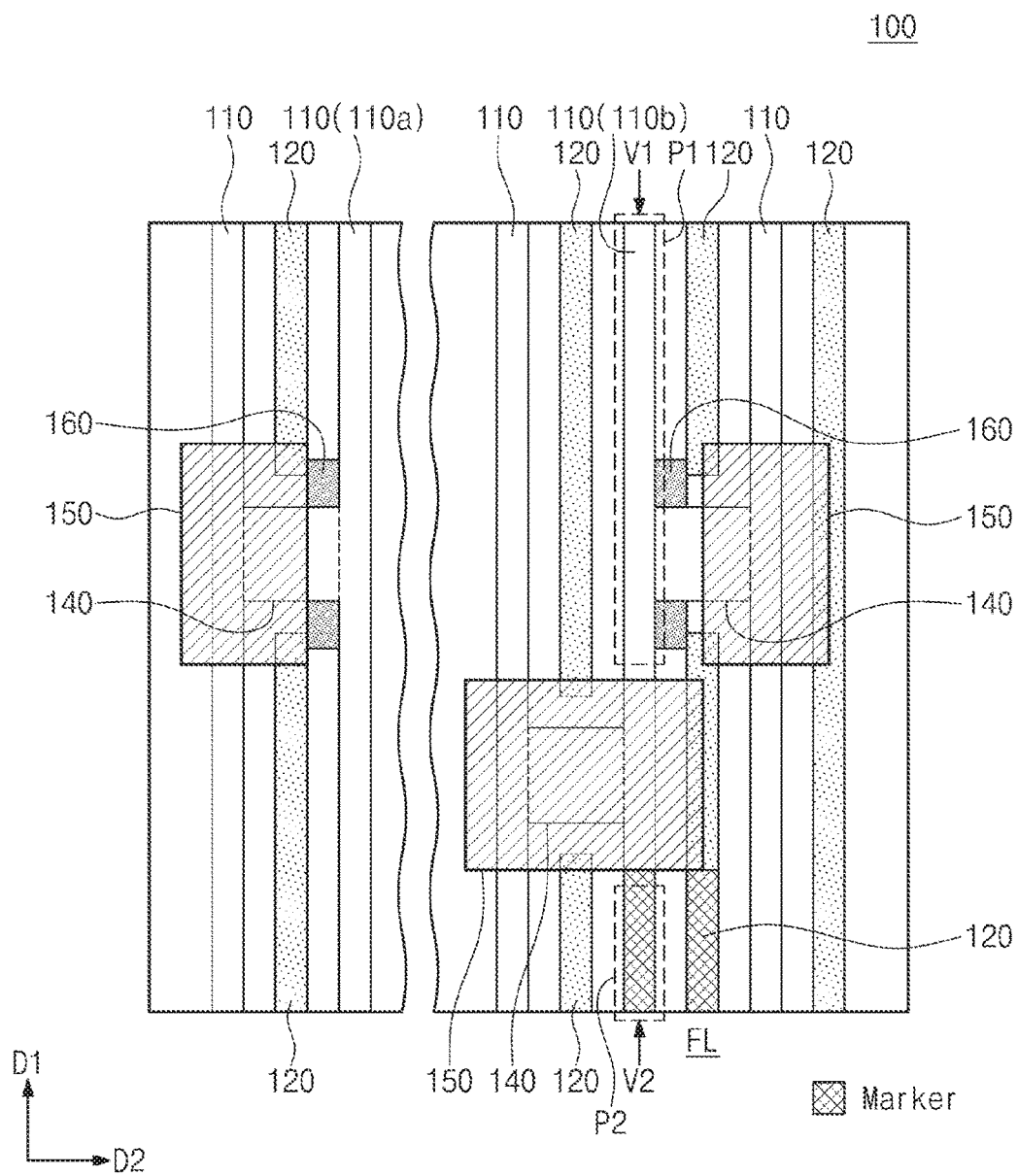

Referring to FIGS. 1 and 6, in a case in which an error does not occur when the design rule check is performed (1), the first pattern 110b and the second pattern 120 may pass the design rule check (S700). In this case, the first pattern 110b and the second pattern 120 may not be provided with the marker and may not need the correction. On the other hand, in case that an error occurs when the design rule check is performed (2), the first pattern 110b and the second patter pattern 120 may be provided with the marker (S800). For example, as discussed with reference to FIG. 4, in the event that the second pattern 120 connected to the first part P1 by the virtual pattern 160 is the floating pattern, the bias of the second pattern 120 may be changed by the voltage V1 applied to the first part P1. In this case, different voltages may be applied to the second part P2 and the second pattern 120 which are adjacent to each other in the second direction D2. Therefore, an error may occur under the space rule check. In this case, as shown in FIG. 6, the second part P2 and the second pattern 120 may be provided with the marker.

Figure 7:
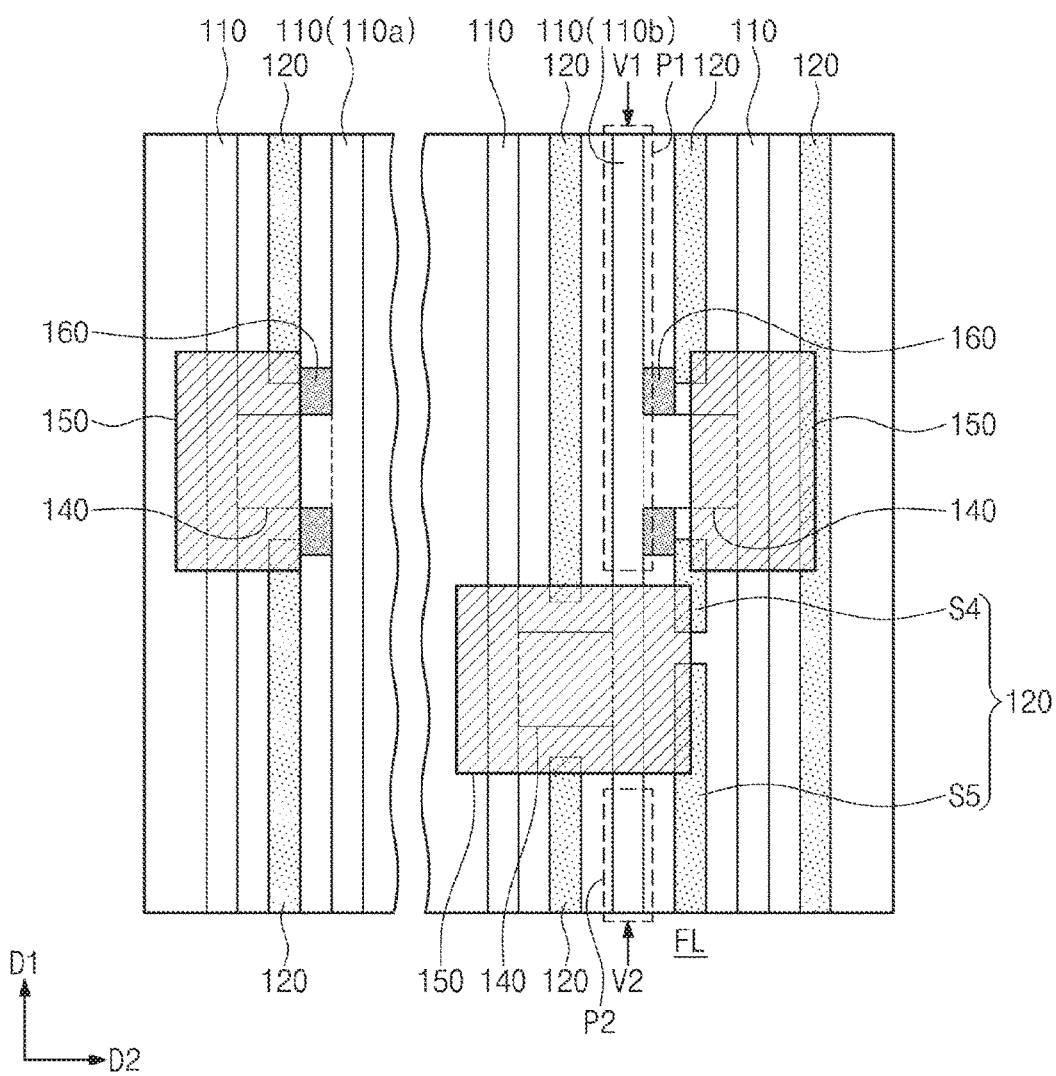

Referring to FIGS. 1 and 7, a correction may be performed on the second pattern 120 provided with the marker (S900). The correction may include cutting the second pattern 120 provided with the marker into a plurality of segments S4 and S5. The plurality of segments S4 and S5 may be floating patterns that are spaced apart from each other in the first direction D1. In this case, when the pattern layout 100 is transcribed on a wafer, it may be possible to prevent the bias of the pattern corresponding to (i.e., transcribed from) the second pattern 120 from being changed due to voltage applied to a pattern corresponding to (i.e. transcribed from) the first part P1 even if an actual defect (e.g., a bridge) has occurred at the predicted defect point, i.e., a point corresponding to that where the virtual pattern 160 was formed. That is, at least one S5 of the plurality of segments S4 and S5 may maintain a floating state (e.g., an electrically insulated state).

Subsequently, the marker and the virtual pattern 160 may be removed.

Figure 8:
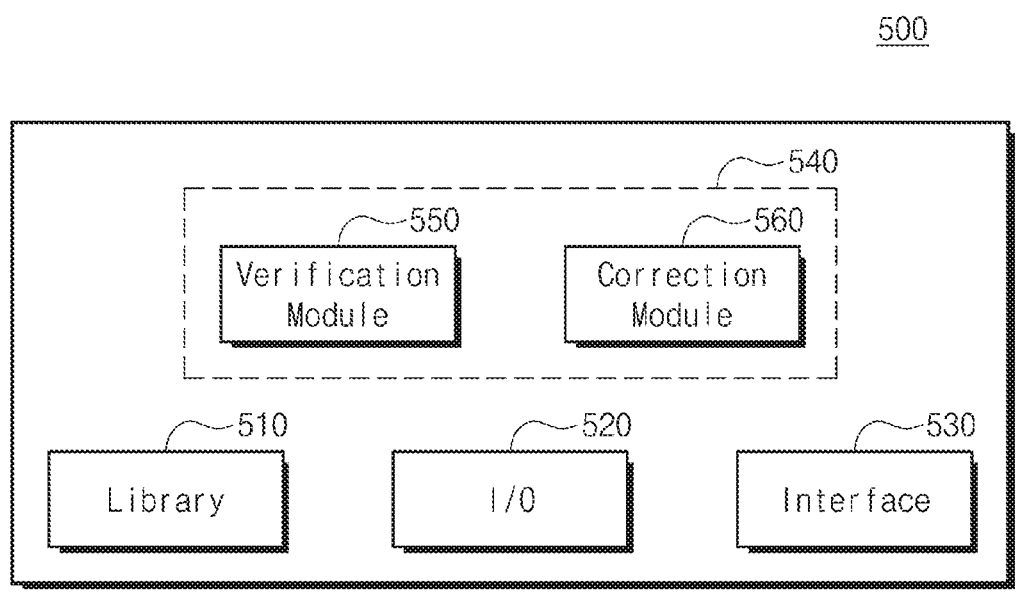
FIG. 8 is a block diagram of a computer system configured to perform a method for verifying a layout designed for a semiconductor integrated circuit, according to the present inventive concept.

FIG. 8 is a diagram illustrating a computer system configured to perform a method for verifying a layout designed for a semiconductor integrated circuit according to exemplary examples of the present inventive concept.

As is traditional in the field, this example of a computer system is described and illustrated in terms of blocks which carry out a described function or functions. These blocks, which may also be referred to as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrates such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the example may be physically separated into two or more interacting and discrete blocks without departing from the scope of the inventive concept. Likewise, the blocks of the example may be physically combined into more complex blocks without departing from the scope of the inventive concept.

In more detail with reference to FIG. 8, a computer system 500 according to the inventive concept may include a library 510 that stores a layout pattern for forming a semiconductor integrated circuit. The library 510 may be implemented in the form of a hard disk and/or a nonvolatile semiconductor memory device (e.g., a flash memory device, a phase change memory device, and/or a magnetic memory device). The computer system 500 may include a controller 540 that processes various data. The controller 540 may include a verification module 550 to verify the layout pattern provided from the library 510 and a correction module 560 to correct the layout pattern. In more detail, the verification module 550 may provide a virtual pattern to a predicted defect point in the layout pattern provided from the library 510 (S200 of FIG. 1) and detect a first pattern, from patterns of the layout pattern, directly adjacent to the virtual pattern (S300 of FIG. 1). The verification module 550 may determine whether the first pattern is a floating pattern (S400 of FIG. 1). When the first pattern is the floating pattern, the verification module 550 may provide the first pattern with a marker (S500 of FIG. 1). When the first pattern is not the floating pattern, the verification module may perform a design rule check on the first pattern and a second pattern adjacent to the first pattern (S600 of FIG. 1). In the case in which an error is not revealed when the design rule check is performed, the verification module 550 does not provide the first pattern and the second pattern with a marker (S700 of FIG. 1). In the case in which an error is discovered when the design rule check is preformed, the verification module 550 may provide each of the first pattern and the second pattern with a marker (S800 of FIG. 1). The correction module 560 may correct a layout of a pattern including the marker provided from the verification module 550 (S900 of FIG. 1). For example, the correction module 560 may divide the pattern provided with the marker into a plurality of segments when the pattern is a floating pattern. The library 510 may store again the pattern layout corrected by the correction module 560. The computer system 500 may include an input/output (I/O: 520) and an interface (530). The input/output 520 may include a keyboard, a keypad, and/or a display device. Various data provided from outside may be transferred to the computer system 500 through the interface 530, and various data processed by the computer system 500 may also be transferred to the outside through the interface 530. The interface 530 may include a wired component, a wireless component, and/or a universal serial bus (USB) port. A data bus may be provided to connect the library 510, the input/output 520, the interface 530, and the controller 540 to one another.

Figure 9:
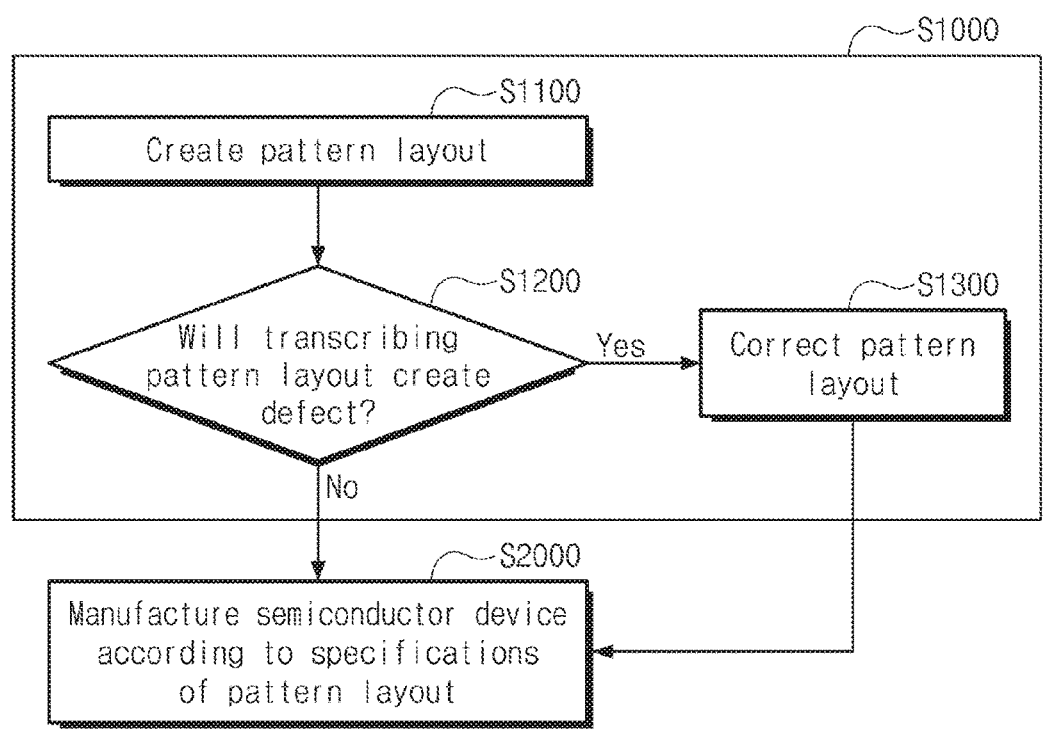
FIG. 9 is a flow chart of examples of a method of manufacturing an integrated circuit of a semiconductor device according to the present inventive concept.

FIG. 9 is a flow chart illustrating a method of manufacturing semiconductor device having an integrated circuit, according to the inventive concept. The method includes a design phase S1000 of creating a pattern layout the same as that of any of the examples shown in and described with reference to FIGS. 1-7, and a fabrication phase S2000 including the manufacturing of an integrated circuit according to the specifications of the pattern layout created in the design phase S1000. Therefore, in describing an example of the design phase S1000 of the method of FIG. 9, for the sake of brevity reference may be made to steps shown in and described with reference to FIG. 1 without repeating the detailed descriptions of such steps.

Referring now to FIGS. 1 and 9, the design phase S1000 may include a process S1100 of creating a pattern layout specifying patterns of an integrated circuit as viewed in plan. The process S1100 may be similar to step S100 in the method of FIG. 1. Next, in process S1200, the pattern layout designed in step S1000 is analyzed to determine whether a defect, such as a bridge, will occur in patterns of the integrated circuit formed if the patterns of the pattern layout were transcribed as is on a substrate using a semiconductor device patterning process. Here, the semiconductor device patterning process refers to any known process of transcribing patterns on a substrate, i.e., a patterning process that includes a series of deposition, masking and etching processes which are conventional per se. The analyzing process S1200 comprises respective ones of the steps S200, S300 S400 and S600 of the method of FIG. 1.

For example, analyzing process S1200 includes predicting a location in the integrated circuit where a defect will occur when patterns, corresponding to those specified by the pattern layout, are formed on a substrate, and providing a virtual pattern on a point in the pattern layout based on the predicted location of the defect (S200). Analyzing process S1200 also includes identifying a pattern of the pattern layout that is adjacent to the virtual pattern (S300), and determining whether the identified pattern requires correction in the pattern layout. As was described in connection with FIGS. 1-7, the determining of whether the identified pattern requires correction may include a determination of whether the identified pattern is a floating pattern (S400). The determining of whether the identified pattern requires correction may additionally include checking adjacent patterns against a design rule in a case in which an identified one of the adjacent patterns is not a floating pattern (S600).

The design phase S1000 also includes a correction process S1300 of correcting the pattern layout created in process S1100 in a certain case or cases. The correction process 1300 comprises the steps S500 and S800 carried out selectively in the method of FIG. 1. Generally speaking, therefore, the correction process 1300 may include selectively providing at least one of the patterns specified by the pattern layout created in process S1100 with a marker based on a result of the process S1300 of determining whether the identified pattern requires correction, and correcting the pattern layout when at least one of the patterns specified by the pattern layout is provided with such a marker. For example, each pattern, provided with a marker, is divided into segments in the pattern layout.

In the manufacturing phase S2000, patterns, corresponding to those specified by the pattern layout including any corrections made as a result of the correction process S1300, are transcribed on a substrate using the same processes, conventional per se, that were considered in predicting whether a defect would be created if the pattern layout created in process S1100 were transcribed as is on a substrate. In this respect, a mask or mask set is produced depending on the pattern layout and corrected if was necessary. In any case, as a result, an integrated circuit having a layer conductive patterns free of defects and corresponding to patterns 110, 120 and 140, or patterns 110a, 120 and 140, or patterns 110b, 120 and 140 (FIG. 5, 6 or 7), for example, is manufactured.

According to the present inventive concept, the virtual pattern may be provided at the predicted defect point in the pattern layout during the verification (analysis) of the pattern layout designed for specifying patterns of a semiconductor integrated circuit, and the pattern layout may be corrected using the virtual pattern. It therefore may be possible to minimize a defect that can occur in patterns on a wafer when the pattern layout is transcribed on the wafer. In addition, because the verification step is performed to predict a defect weak point so as to correct the pattern layout prior to a fabrication process for a semiconductor device in which the pattern layout is transcribed on the wafer, it may be possible to easily prevent the occurrence of the defect.

Although the present inventive concept has been described in connection with examples illustrated in the accompanying drawings, it is not limited thereto. It will be apparent to those skilled in the art that various substitution, modifications and changes may be made to the examples without departing from the scope and spirit of the inventive concept.

What is claimed is:

1. A method of designing an integrated circuit of a semiconductor device, the method comprising:
   providing a pattern layout comprising a plan view of patterns, and which specifies patterns of the integrated circuit; and
   performing a pattern check/layout correcting process that includes:
   providing a virtual pattern on a predicted defect point in the pattern layout as adjacent to each of respective ones of the patterns, the predicted defect point being a predictor of a location where a defect will occur when said respective ones of the patterns of the pattern layout are transcribed on a wafer,
   making a determination regarding each of at least one of the respective patterns that is adjacent to the virtual pattern in the pattern layout, and
   when the determination yields a given result, identifying at least one of the respective patterns and revising the pattern layout by altering one of the respective patterns that has been identified,
   wherein the altering comprises dividing said one of the respective patterns into spaced apart segments,
   wherein the pattern layout comprises at least one first pattern and a second pattern that each extends in a first direction and are spaced apart from each other in a second direction crossing the first direction,
   wherein the virtual pattern connects the first pattern and the second pattern to each other,
   wherein the determination made in the pattern check/layout correcting process is made as to the first pattern connected to the virtual pattern in the pattern layout,
   wherein the making of the determination includes determining whether the first pattern connected to the virtual pattern is a floating pattern, and
   wherein the pattern check/layout correcting process includes providing the first pattern connected to the virtual pattern with a marker when the first pattern is determined to be a floating pattern.

2. The method of claim 1,
   wherein the first pattern is a linear pattern extending longitudinally in the first direction, and
   the altering of the first pattern provided with the marker comprises dividing the first pattern provided with the marker into a plurality of linear segments, the plurality of linear segments being floating patterns spaced apart from each other in the first direction.

3. The method of claim 1, wherein the making of the determination in the pattern check/layout correcting process includes performing a design rule check on the first pattern and the second pattern connected to the virtual pattern when the first pattern is determined as not being a floating pattern, and
   the pattern check/layout correcting process includes providing the first pattern and the second pattern connected to the virtual pattern with markers, respectively, when an error is revealed under the design rule check, and altering the second pattern provided with the marker.

4. The method of claim 3, wherein
   the pattern layout comprises a trim pattern that runs across the first pattern connected to the virtual pattern in the plan view,
   the first pattern has a first part and a second part that are divided by the trim pattern, the first part being connected to the second pattern by the virtual pattern and the second part being spaced apart from the second pattern, and
   performing the design rule check comprises, with respect to the first pattern and the second pattern connected to the virtual pattern, checking a space rule between patterns to which different voltages are applied.

5. The method of claim 3,
   wherein the second pattern is a linear pattern extending longitudinally in the first direction, and
   the altering of the second pattern provided with the marker comprises dividing the second pattern provided with the marker into a plurality of linear segments, the plurality of linear segments being floating patterns spaced apart from each other in the first direction.

6. The method of claim 1, wherein
   the at least one first pattern of the pattern layout comprises first patterns spaced apart in the second direction,
   the pattern layout includes:
   a pair of respective ones of the first patterns that are adjacent to each other in the second direction, the second pattern being interposed between the first patterns of said pair,
   an interconnect pattern that connects the first patterns of the pair to each other and is spaced apart from the second pattern in the plan view, and
   a trim pattern that overlaps the interconnect pattern to expose a portion of the interconnect pattern in the plan view, the virtual pattern is provided, adjacent to the portion of the interconnect pattern exposed by the trim pattern, to span the second pattern and one of the first patterns of the pair, and the determination made in the pattern check/layout correcting process is with regard to said one of the first patterns of the pair.

7. A computer system comprising:

a library configured to store and provide for verification a pattern layout comprising a plan view of patterns, and which specifies patterns of the integrated circuit;

a verification module that verifies the pattern layout provided by the library, wherein the verification module is configured to provide a virtual pattern on a predicted defect point in the pattern layout, and make a determination regarding at least one pattern, from among the patterns of the pattern layout, adjacent to the virtual pattern in the pattern layout, and identify at least one of the patterns adjacent to the virtual pattern in the pattern layout as a result of the determination, the predicted defect point being a predictor of a location where a defect will occur when the patterns of the pattern layout, provided by the library, are transcribed on a wafer; and a correction module configured to revise the pattern layout by altering one pattern identified by the verification module as the result of said determination, wherein the altering of the one pattern comprises dividing the one pattern into spaced apart segments, wherein the patterns of the pattern layout include a first pattern and a second pattern each extending in a first direction so as to be parallel and spaced apart from each other in a second direction crossing the first direction in plan view, and wherein the virtual pattern is provided as connecting the first pattern and the second pattern to each other.

8. The computer system of claim 7, wherein the correction module is configured to alter the first pattern provided with the marker by dividing the first pattern provided with the marker into a plurality of linear segments, the plurality of linear segments being floating patterns spaced apart from each other in the first direction.

9. The computer system of claim 7, wherein the determination made by the verification module includes a design rule check on the first pattern and the second pattern when the first pattern is not the floating pattern, and is configured to provide the first pattern and the second pattern with markers, respectively, when an error is revealed under the design rule check.

10. The computer system of claim 9, wherein
the pattern layout comprises a trim pattern that runs across the first pattern in the plan view,
the first pattern comprises a first part and a second part on opposite sides of the trim pattern, the first part being connected to the second pattern by the virtual pattern and the second part being spaced apart from the second pattern, and
the design rule check comprises, with respect to the first pattern and the second pattern, checking a space rule between patterns to which different voltages are applied.

11. The computer system of claim 10, wherein the correction module is configured to alter the second pattern provided with the marker by dividing the second pattern provided with the marker into a plurality of linear segments, the plurality of linear segments being floating patterns spaced apart from each other in the first direction.

12. A method of manufacturing an integrated circuit of a semiconductor device, the method comprising:

designing a pattern layout comprising a plan view of patterns, and which specifies patterns of the integrated circuit;

performing a pattern check/layout correcting process that includes:

predicting a location in the integrated circuit where a defect will occur when patterns, corresponding to those specified by the pattern layout, are formed on a substrate by a semiconductor device patterning process of transcribing the patterns of the pattern layout on the substrate, when a location of a defect in the integrated circuit is predicted, providing a virtual pattern on a point adjacent respective ones of the patterns in the pattern layout based on the predicted location of the defect, making a determination by which at least one of the respective patterns adjacent to the virtual pattern is identified when certain results of the determination are produced, and when the determination results in the identifying of at least one of the respective patterns adjacent to the virtual pattern, revising the pattern layout by altering one of the respective patterns identified; and subsequently manufacturing the integrated circuit including by performing the semiconductor device patterning process to transcribe patterns, corresponding to those specified by the pattern layout, on a substrate, wherein the altering of the one of the respective patterns comprises dividing said one of the respective patterns into spaced apart segments, and wherein the pattern check/layout correcting process includes providing a first pattern connected to the virtual pattern with a marker when the first pattern is determined to be a floating pattern.

13. The method of claim 12, wherein the making of the determination in the pattern check/layout correcting process includes:

determining in advance of the manufacturing of the integrated circuit whether a pattern, that will be formed on the substrate by the transcribing of the pattern of the pattern layout that is adjacent to the virtual pattern, is electrically isolated in the integrated circuit from the other patterns that will be formed on the substrate by the semiconductor device patterning process.

14. The method of claim 13, wherein the pattern check/layout correcting process includes:

a marker providing process of selectively providing at least one of the patterns specified by the pattern layout with said marker based on results of said determination, and the revising of the pattern layout is executed when at least one of the patterns specified by the pattern layout is provided with a said marker.

15. The method of claim 14, wherein the revising of the pattern layout includes dividing one of the patterns, provided with a said marker, into linear segments in the pattern layout.

* * * * *